United States Patent [19]

Sleighter

[11] 4,303,435
[45] Dec. 1, 1981

[54] GLASS RIBBON FLOAT TANK WITH A PYROMETER ASSEMBLY HAVING A HEATED VIEWING TUBE AND METHOD OF USE

[75] Inventor: George E. Sleighter, Natrona Heights, Pa.

[73] Assignee: PPG Industries, Inc., Pittsburgh, Pa.

[21] Appl. No.: 211,597

[22] Filed: Dec. 1, 1980

Related U.S. Application Data

[63] Continuation of Ser. No. 22,654, Mar. 22, 1979, Pat. No. 4,259,866.

[51] Int. Cl.³ .............................................. C03B 18/18
[52] U.S. Cl. ...................................... 65/29; 65/99 A; 65/158; 65/162; 73/355 R
[58] Field of Search ................. 65/29, 158, 162, 99 A; 73/355 R; 350/61, 63

[56] References Cited

U.S. PATENT DOCUMENTS

| | | | |
|---|---|---|---|
| 3,067,327 | 12/1962 | Scott et al. | 250/373 X |
| 3,387,551 | 6/1968 | Hughes | 65/158 X |
| 3,436,965 | 4/1969 | Land | 73/355 R |
| 3,473,905 | 10/1969 | Jago et al. | 65/29 X |
| 3,976,460 | 8/1976 | Kompare et al. | 65/32 X |
| 3,998,616 | 12/1976 | Farabaugh | 65/29 |
| 4,037,473 | 7/1977 | Compton et al. | 73/355 X |
| 4,043,780 | 8/1977 | Bricker et al. | 65/29 |
| 4,120,200 | 10/1978 | Braun | 73/355 R |
| 4,150,869 | 4/1979 | Hansen | 350/61 |
| 4,201,563 | 5/1980 | Bricker | 65/29 X |

OTHER PUBLICATIONS

Land Product Information—New Infra-Red Thermometers for Glass Models O-C-GV and N-C-GV.
Land System 2 published by Land Pyrometers Ltd.
Land Mountings and Accessories for Infra-Red Thermometers—Land Pyrometers Ltd.

Primary Examiner—Arthur D. Kellogg
Attorney, Agent, or Firm—Donald Carl Lepiane

[57] ABSTRACT

A viewing tube extension for an infrared radiation pyrometer includes a tube having a heater therein. The heater has a passageway so that the pyrometer sights a glass ribbon moving through a forming chamber of a flat glass making apparatus. Vapors from the heating chamber moving into the tube are maintained above their dew point as a purge gas moves the vapors out of the tube.

13 Claims, 6 Drawing Figures

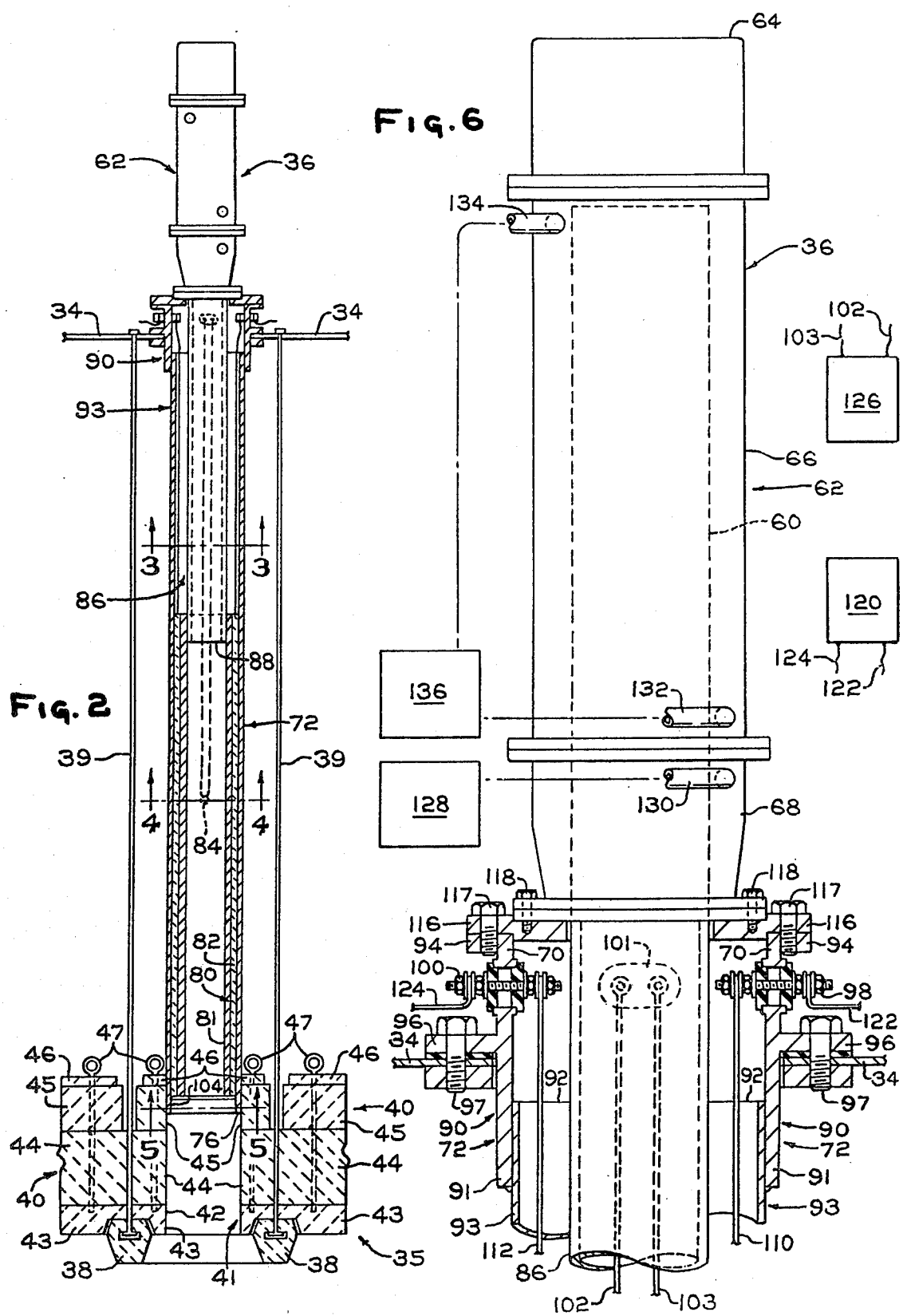

GLASS RIBBON FLOAT TANK WITH A PYROMETER ASSEMBLY HAVING A HEATED VIEWING TUBE AND METHOD OF USE

This is a continuation of application Ser. No. 22,654, filed Mar. 22, 1979 now U.S. Pat. No. 4,259,866.

FIELD OF THE INVENTION

This invention relates to a pyrometer assembly and method of using same to monitor the temperature of a substrate in a heated environment, e.g., a glass ribbon moving through a forming chamber of a glass making apparatus.

DISCUSSION OF THE PRIOR ART AND TECHNICAL PROBLEMS

Problems are associated with using radiation pyrometers to measure the temperature of a substrate in a heated vapor atmosphere. For example, radiation pyrometers are normally maintained below a temperature of about 300° F. (148° C.) and even as low as 105° F. (41° C.) to prevent thermal damage to the pyrometers. Maintaining the pyrometers at the required temperature may be accomplished by mounting the pyrometer in a water cooled jacket. In the instance where the pyrometer is used to measure the temperature of a material in a heated vapor atmosphere, and the pyrometer is at a temperature approximately at or below the dew point of the vapors, the vapors condense on the pyrometer, e.g., on the lens of the pyrometer or sight tube of the pyrometer. Condensate on the pyrometer lens reduces the accuracy of the pyrometer. Accumulated condensate on the tube or on the lens may drop on the article whose temperature is being measured. In the instance where the article is a glass ribbon in a glass forming chamber, the condensate e.g. tin sulfide poses an additional problem. Namely, the accumulated condensate may fall on the glass ribbon or the condensate may be reduced by the atmosphere of the glass forming chamber to liquid tin which may drop on the ribbon. In either instance the result is glass that is not useable.

The prior art has solutions to the above problems, however there are limitations to these prior art solutions. For example, U.S. Pat. No. 4,034,780 teaches that the temperature profile of a glass sheet moving through a bending furnace is made by a pyrometer mounted outside the furnace and moving in alignment with a plurality of normally closed viewing tubes. As the pyrometer moves over a viewing tube, the end of the tube opens and the pyrometer sights through the tube to measure the temperature of the glass sheet. Continual movement of the pyrometer actuates the mechanism for each tube to open or close the tube end as required. With this arrangement the atmosphere within the furnace can be maintained and the pyrometer protected from thermal damage. Limitations of the above techniques are the need (1) for an operating mechanism to open and close each tube and (2) to maintain alignment between the tube and the pyrometer.

In view of the above, it would be advantageous to provide a pyrometer assembly that can be used to measure the temperature of a substrate in a heated vapor atmosphere that does not have limitations or drawbacks of the prior art.

SUMMARY OF THE INVENTION

This invention relates to a viewing tube for use in combination with a pyrometer e.g., radiation pyrometer which is used for monitoring the temperature of a substrate, e.g. a glass ribbon in a heated vapor atmosphere such as a forming chamber of a glass making apparatus. The viewing tube has heating facilities having a viewing passageway therethrough to provide a field of view for the pyrometer and facilities for connecting the pyrometer and the heater to prevent uncontrolled movement of atmosphere between the pyrometer and the heater.

This invention also relates to a method of monitoring the temperature of a substrate using the combination viewing tube and pyrometer. In one embodiment vapors moving into the heater toward the pyrometer are maintained above their dew point as a purging gas moves through the heater to move the vapors out of the heater. In another embodiment condensates of tin sulfide form on the unenergized heater. At a preselected time, the heater is energized as undiluted nitrogen moves over the condensate to sublime same and move the vapors out of the heater.

BRIEF DESCRIPTION OF THE DRAWING

FIG. 2 is an enlarged view of the pyrometer assembly of FIG. 1;

FIG. 6 is a side elevated view of the upper portion of the pyrometer assembly shown in FIG. 2.

DESCRIPTION OF THE INVENTION

This invention relates to a pyrometer viewing tube that prevents vapors from condensing in the tube and/or removal of condensate from within the tube. In the following discussion, the viewing tube and radiation pyrometer i.e., temperature monitoring device are used in the forming chamber of a glass making apparatus. However, as will be appreciated, the invention is not limited thereto.

Figure 1:
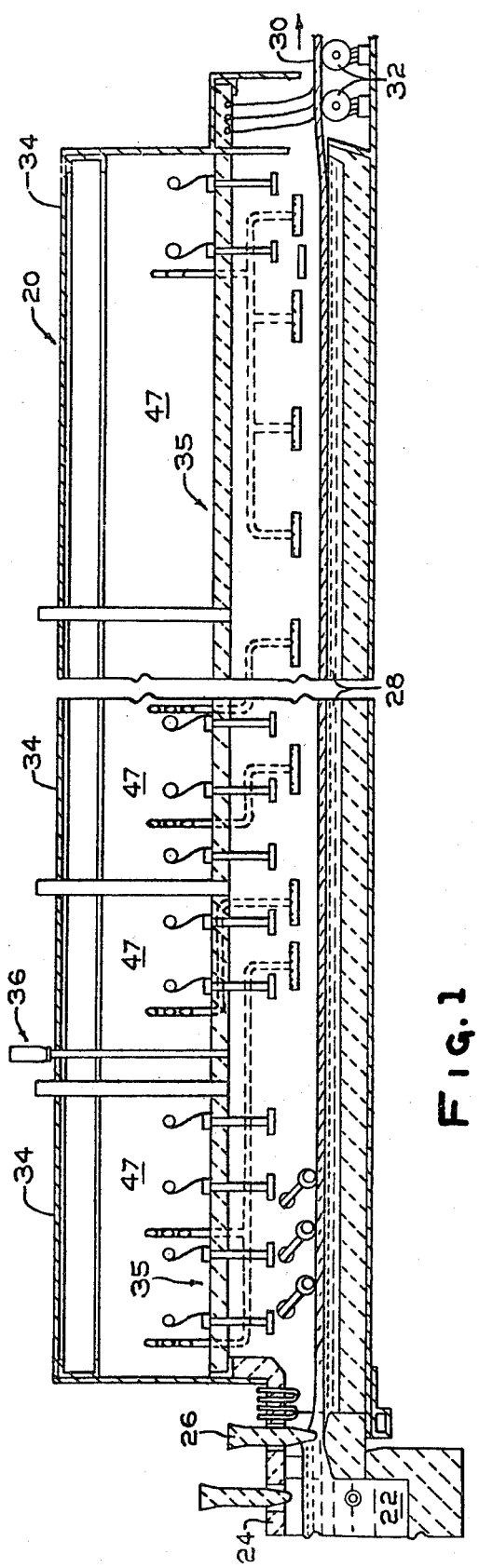
FIG. 1 is a side elevated view of a glass forming chamber having a pyrometer assembly of the instant invention mounted through the suspended roof of the chamber.

With reference to FIG. 1, there is shown a forming chamber 20 of the type taught in U.S. Pat. No. 3,976,460, which teachings are hereby incorporated by reference. In general, glass making ingredients are fed into and melted in a melter (not shown) to make molten glass 22. The molten glass 22 flows downstream into a refiner 24 where the molten glass is fined and conditioned. Thereafter the molten glass is controllably flowed past a tweel 26 onto a pool 28 of molten tin contained in the glass forming chamber 30. As the molten glass flows along the molten tin it is selectively and controllably cooled and sized to a dimensionally stable glass ribbon 30, e.g. as taught in U.S. Pat. No. 3,998,616, which teachings are hereby incorporated by reference. The glass ribbon 30 exits the chamber 20 by way of lift off roll 32.

Mounted at a preselected position through metal casing 34 and suspended roof 35 of the chamber 20 is a pyrometer assembly 36 incorporating features of the invention to monitor ribbon temperature to control its viscosity as it moves through the forming regions of the chamber 20. With reference to FIG. 2, the suspended roof 35, in general, includes a plurality of spaced refractory supports 38 conveniently mounted on ends of suspension rods 39 to form a grid or generally rectangular sections (only 3 supports 38 shown in FIG. 2). Selected ones of the rectangular sections support plug block assemblies 40 and others support element block assemblies 41. The plug block assemblies 40 and element block assemblies 41 are identical in construction except that the element block assemblies 41 (only one shown in FIG. 2) have a passageway 42 therein for receiving an element which in the instant invention is an end of the temperature monitoring device 36. The plug block assemblies 40 and element block assemblies 41 each include a mullite refractory slab 43; a high temperature insulating layer 44 e.g., an insulating firebrick capable of withstanding temperatures of up to about 2600° F. (1427° C.); another layer 45 of insulating firebrick capable of withstanding temperatures of up to about 1800° F., (982° C.); and a layer 46 of a hard faced insulating board to provide structural stability for rods 48 which hold the layers 43–46 together. As will be appreciated, the invention is not limited to the construction of the suspended roof 35 and any convenient type of suspended roof may be used in the practice of the invention. Further, in certain instances the depth of the plenum area 47, i.e. the area between the metal casing 34 and the suspended roof 35 varies and the pyrometer assembly 36 may be short of the suspended roof 35. When this occurs element block assemblies 41 may be piled one on top of the other.

With reference to FIG. 6, pyrometer 60 (shown in phantom) is mounted in housing 62. The housing 62 includes an end cap 64 secured to a water cooled jacket 66 which in turn is secured to a gas purging section 68. The pyrometer 60 and housing 62 are not limiting to the invention and any convenient type known in the art may be used in the practice of the invention. The housing 62 is mounted on end 70 of viewing tube 72. The opposite end 76 of the viewing tube 72 is mounted in the hole 42 of element block assembly 41 as shown in FIG. 2. It is recommended that the tube end 76 extend below at least the plate 46 of the element block assembly 41 to prevent or minimize hostile atmosphere of the forming chamber from moving into plenum area 47 shown in FIG. 1. If the vapors of the forming chamber move into the plenum area they may chemically and/or thermally damage piping and wiring contained therein.

Figure 4:
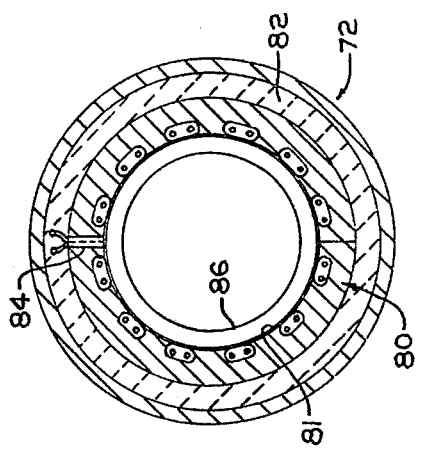
FIG. 4 is a view taken along lines 4—4 of FIG. 2.

With reference to FIGS. 2 and 4, heating element 80 having passageway 81 therethrough is mounted in the tube 72 to maintain the temperature within the tube, i.e. the passageway 81 above the dew point of the forming chamber vapors to prevent condensation of the vapors in the viewing tube. Although not limiting to the invention, it is recommended that the heater 80 terminate short of the pyrometer 60 (see FIG. 6) to prevent thermal damage thereto. To minimize or eliminate thermal conduction from the heater 80 to the plenum area 47 it is recommended that a layer 82 of thermal insulating material be provided around the heater 80. The temperature of the heater 80 may be monitored in any convenient manner, e.g. by thermocouple 84, to monitor the temperature of the heater passageway 81 to make certain the temperature of the passageway 81 is above the dew point of the vapors. Although not limiting to the invention, if a pyrometer sight tube, for example shown as numeral 86 in FIGS. 2-6 is used, it is recommended that its end, for example end 88, extend into the heater 80 as shown in FIG. 2. In this manner (1) vapors are prevented from moving between the walls of the viewing tube and sight tube and (2) turbulence of the flow of the purge gas is minimized to prevent uncontrolled movement of vapors upward toward the pyrometer.

In one embodiment of the invention, the heater 80 is energized as a purge gas moves through the viewing tube 72. Vapors in the chamber 20 which move upward in the heater passageway 81 are maintained above their dew point by the heater to prevent condensation. The vapors are prevented from continued upward movement and urged out of the tube by the purge gas. The type, pressure and temperature of the purge gas are not limiting to the invention. However, it is recommended that the gas be inert relative to the vapors to prevent chemical reactions therewith. Further, the temperature and flow of the purged gas out of the tube should not upset thermal equilibrium of the chamber containing the article, for example glass ribbon 30. The temperature of the gas can be elevated by preheating before moving the purged gas through the heater passageway 81 or the gas can be heated as it moves through the heater passageway 81. Another embodiment of the invention which is used to remove condensate from the tube 72 is discussed below.

DETAILED DESCRIPTION OF THE INVENTION

The instant invention is practiced to monitor the temperature of a glass ribbon 30 as it is supported on the molten tin bath 28 and moves through the forming chamber 20 to determine the viscosity of the glass as it moves through the sizing regions of the forming chamber. If the temperature as determined by the pyrometer indicates that the viscosity is too high, in other words the temperature is too low, heat input to the chamber 20 is increased. Conversely, if the temperature of the glass indicates that the viscosity is too low, i.e. the temperature of the glass is too high, heat input to the chamber 20 is decreased. In this manner the temperature of the glass and its viscosity can be controlled as it moves through the sizing regions to provide controlled attenuation of the ribbon which results in uniform thickness between the edges of the ribbon. Pyrometer assembly 36 incorporating features of the invention is mounted in metal casing 34 and suspended roof 35 of the forming chamber 20 in a manner to be discussed below and spaced about 50 feet (15 meters) downstream of the tweel 26.

Figure 5:
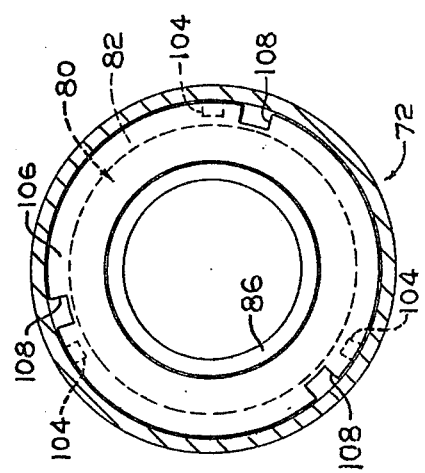
FIG. 5 is a view taken along lines 5—5 of FIG. 2.

With reference to FIGS. 2 and 6, the pyrometer assembly 36 includes a viewing tube 72, a pyrometer 60 and housing 62. The viewing tube 72 includes a first steel tube 90 having an end 91 overlapping end 92 of a second steel tube 93 and welded together to provide the viewing tube with an overall length of about 4½ feet (1.35 meters). With reference to FIG. 6, the first tube 90 has a length of about 5 inches (12.5 centimeters), a wall thickness of about ¼ inch (0.64 centimeter) and an inside diameter of about 5 inches (12.5 centimeters). A first flange 70 having a thickness of about 0.37 inch (0.97 centimeter) and an outside diameter of about 6¾ inches (17.14 centimeters) is mounted adjacent tube end 94 for securing the housing 62 to the tube 72 in any convenient manner. A second flange 96 spaced about 2.35 inches (5.97 centimeters) from the first flange 94 has an outside diameter of about 8½ inches (21.6 centimeters) and a thickness of about 0.38 inch (0.97 centimeter) for supporting and securing the viewing tube 72 in position through the roof casing 34 by bolts 97. Mounted through the wall of the tube 90 between the flanges 94 and 96 are a first and second pair of posts 98 and 100, to provide external electrical access to a split heater 80 to control its heat output. Also mounted between the flanges 94 and 96 in the wall of the tube 72 is a ⅛ inch (0.32 centimeter) compression fitting 101 through which thermocouple wires 102 and 103 pass to provide external electrical access to the thermocouple 84 mounted in the heater 80. The second tube 93 has a length of about 47 inches (1.1 meters) and a wall thickness of about ⅛ inch (0.32 centimeter) and an outside diameter of about 5 inches (12.7 centimeters). With reference to FIGS. 2 and 5, pins 104 spaced 120° apart and having a diameter of about 0.187 inch (0.47 centimeter) and a length of about 0.25 (0.64 centimeter) are mounted inside the tube adjacent the end 76 to assist in maintaining the heater 80 in the tube in a manner to be discussed below.

With reference to FIGS. 2 and 4, a heater 80 of the type sold by Thermocraft, Inc., Model No. RL157-1910W-230 Volts, 3 inch (7.62 centimeter) inside diameter (I.D.) and 30 inch (0.75 meter) long has a chromel alumel type thermocouple 84 inserted through the heater wall intermediate its ends. The heater 80 is wrapped with a layer 82 of Fiberfrax thermo insulating material. Thereafter, the wrapped heater is inserted through end 94 of the viewing tube 72 and urged downward toward the pins 104. With reference to FIG. 5 a washer 106 having three spaced cutout portions 108 capable of passing over the pins 104 is mounted in the end 76 of the tube 72 and pushed upward beyond the pins 104 and rotated. The wrapped heater is urged against the washer. The washer 106 has a thickness of about ⅛ inch (0.32 centimeter) and an inside diameter of 3.25 inch (8.26 centimeter) and an outside diameter of 4.75 inches (12.04 centimeters). After the heater is mounted in position, the pair of wires 110 and 112 of the heater 80 (see FIG. 3) are connected to the posts 98 and 100 respectively, and wires 102 and 103 of the thermocouple 84 are inserted through the fitting 101 shown in FIG. 6. A sight tube 86 shown in FIG. 2 of the type sold by Land Instrument, Ltd., Model No. STO-24 Sillimanite is mounted through a steel tube adapter 116 (see also FIG. 6) and extends downward with the end 88 of the viewing tube extending into the heater 80 as shown in FIG. 2. The adapter 116 is secured to the end 94 of the viewing tube 72 by bolts 117 as shown in FIG. 6.

Figure 3:
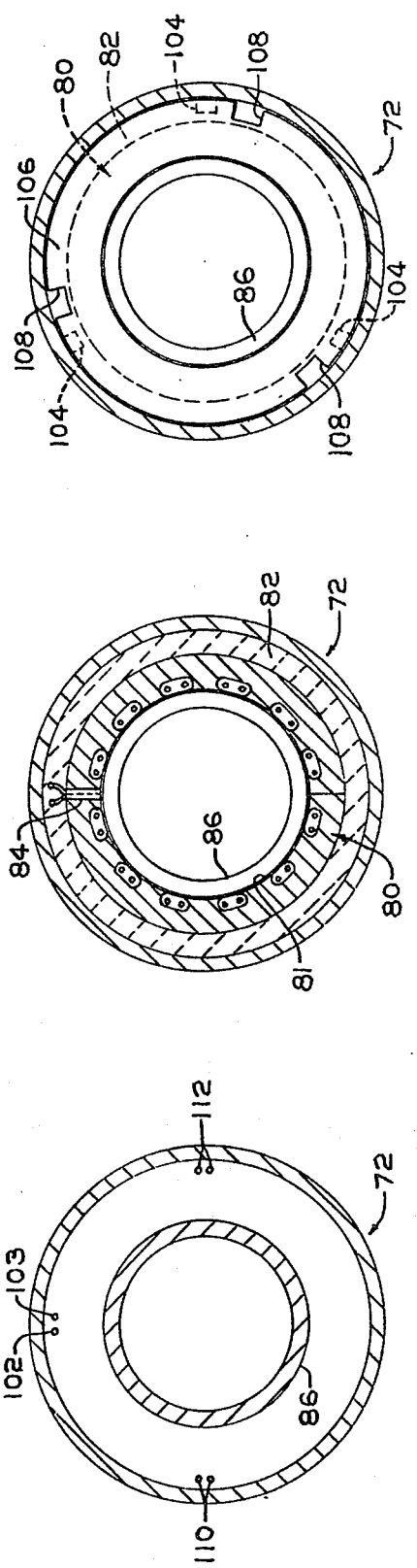
FIG. 3 is a view taken along lines 3—3 of FIG. 2.

A pyrometer 60 of the type sold by Land Instruments, Model No. NCGV6/22F-42V 1800 with an integral preamplifier and a remote processing unit Model 2U-GV11/22F-A is mounted on the sight tube 86. The pyrometer 60 has a spectral response of 4.8 to 5.2 microns to measure the temperature of the glass and not heat reflections of the tin bath. A housing 62 of the type sold by Land including an O/N/C backcap 64 is mounted on an N/WJP water-cooled jacket with integral air purge shown as numerals 66 and 68, respectively, is mounted about the pyrometer and secured in position by bolts 118 passing through the flange of the air purge section 68 and sight tube 86 as shown in FIG. 3. The tube 72 is passed through a hole in the casing 34 and has its end 76 mounted within the passageway 42 formed in the element block assembly 41 as shown in FIG. 2. With reference to FIG. 6, the posts 98 and 100 are connected to an electrical potential 120 by cables 122 and 124, respectively to supply current to the heater 80. The thermocouple 84 is connected through wires 102 and 103 extending outside of the viewing tube 72 to a temperature recorder 126. The purge section 68 is connected to a nitrogen supply 128 by pipe 130. The inlet pipe 132 and outlet pipe 134 of the water-cooled jacket 66 are conveniently connected to a water supply 136 to maintain the pyrometer at temperature of about 100° F. (38° C.).

The heater 80 is energized to heat the heater passageway 81 to a temperature of about 1500° F. (817° C.). The tin sulfide vapors in the forming chamber move upward into the heater passageway 81 as shown in FIG. 2. The vapors have a dew point of about 1400° F. (760° C.) and are normally at a temperature of about 1650° F. (899° C.). As vapors move upward through the tube toward the pyrometer, the heated passageway 81 maintains the vapors above their dew point. The purge gas moving through the sight tube 86 and the heater passageway 81 at a flow rate of 35-50 standard cubic feet per hour (SCFH) urges the vapors back into the forming chamber.

When condensates such as tin sulfide sublime the following technique, which is another embodiment of the invention, may be used. The tin sulfide vapors are allowed to condense within the heater passageway 81 and at periodic intervals, e.g. once a day, the heater 80 is energized to heat the passageway 81 to a temperature of about 1500° F. (817° C.) as an inert gas e.g. nitrogen moves through the tube heater passageway 81. In the presence of nitrogen the condensate sublimes at these temperatures after which the vapors are moved out of the tube.

As can be appreciated, the invention is not limiting to the above examples which are presented for illustration purposes only.

What is claimed is:

1. A pyrometer assembly for monitoring the temperature of a glass ribbon supported on a pool of molten metal contained in a forming chamber of a flat glass apparatus, the forming chamber having a vapor atmosphere therein, comprising:
   a pyrometer;
   heating means having a viewing passageway therethrough;
   means for aligning said pyrometer with the passageway of said heater;
   means for connecting the pyrometer and said heater to one another to prevent uncontrolled movement of gas therebetween;
   means for moving a gas through said connecting means; and
   means for mounting said tube in roof of the forming chamber.

2. The pyrometer assembly as set forth in claim 1 wherein said connecting means includes a tube having said heater mounted therein with said pyrometer mounted on said tube, further including:
   insulating material mounted between said heating means and inner walls of said tube.

3. The pyrometer assembly as set forth in claim 2 wherein said tube is a first tube: said heating means is adjacent first end of said tube and spaced from opposite second end of said tube and further including:
   a second tube having an end passing into said inserting means and the opposite end of said second tube supported by said second end of said first tube.

4. The pyrometer assembly as set forth in claim 3 wherein said connecting means includes:
   a capped section;
   a water-cooled section; and a gas purge section.

5. The pyrometer assembly as set forth in claim 1 further including temperature sensing means for monitoring the temperature of said heating means.

6. The pyrometer assembly as set forth in claim 2 wherein said heating means is an electrical resistance heater and further including:
   temperature sensing means for monitoring the temperature of said heating means.

7. The pyrometer assembly as set forth in claim 1 wherein the forming chamber has a suspended roof and said mounting means mounts said tube in the suspended roof of the forming chamber.

8. Method of measuring temperature of a glass ribbon moving on a pool of molten metal through forming chamber of a flat glass making apparatus, the chamber having a heated vapor atmosphere, comprising the steps of:
   viewing the ribbon through heating means by way of temperature sensing means;
   heating the heating means to a temperature greater than the dew point of the vapor atmosphere to prevent condensation of the vapors in the heating means; and
   moving a purge gas through the heating means to move the vapors out of the heating means.

9. The method as set forth in claim 8 wherein the vapor atmosphere includes tin sulfide; the purge gas includes nitrogen; and the heating means is heated to a temperature of greater than about 1400° F. (760° C.).

10. The method as set forth in claim 8 wherein the vapor atmosphere includes tin sulfide, the purge gas is an inert gas and said vapors condense prior to practicing said heating step; said moving gas step and said heating step heats the condensates in the presence of the purge gas to sublime same; and said moving gas step moves the sublimed tin sulfide out of the tube.

11. The method as set forth in claim 9 or 10 further including the step of monitoring the temperature of the heating means.

12. The method as set forth in claim 11 further including the steps of:
   monitoring the temperature of the ribbon;
   changing the temperature of the ribbon in response to the temperature sensed by the temperature sensing means when the temperature shows a deviation from a selected predetermined temperature.

13. The method according to claim 10 wherein the purge gas is nitrogen and the heating means heat the condensate to a temperature above 1400° F. (660° C.).

* * * * *